Nov. 28, 1950 G. H. BECK ET AL 2,531,965
MOLD BASES
Filed March 4, 1949 3 Sheets-Sheet 2
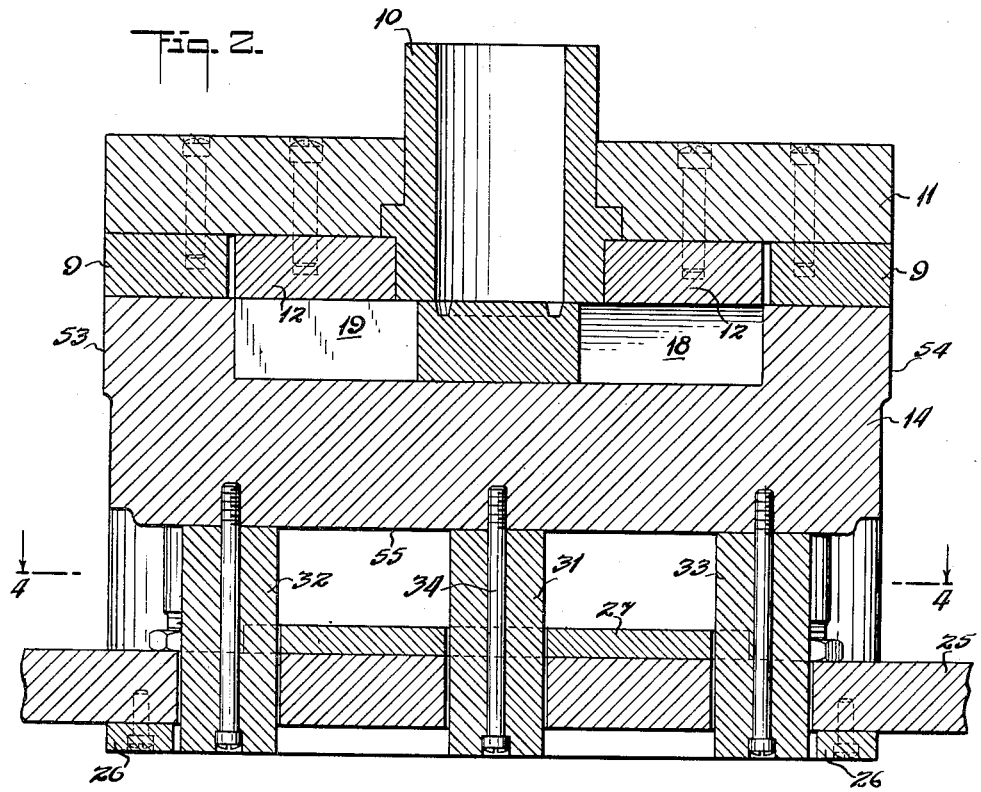
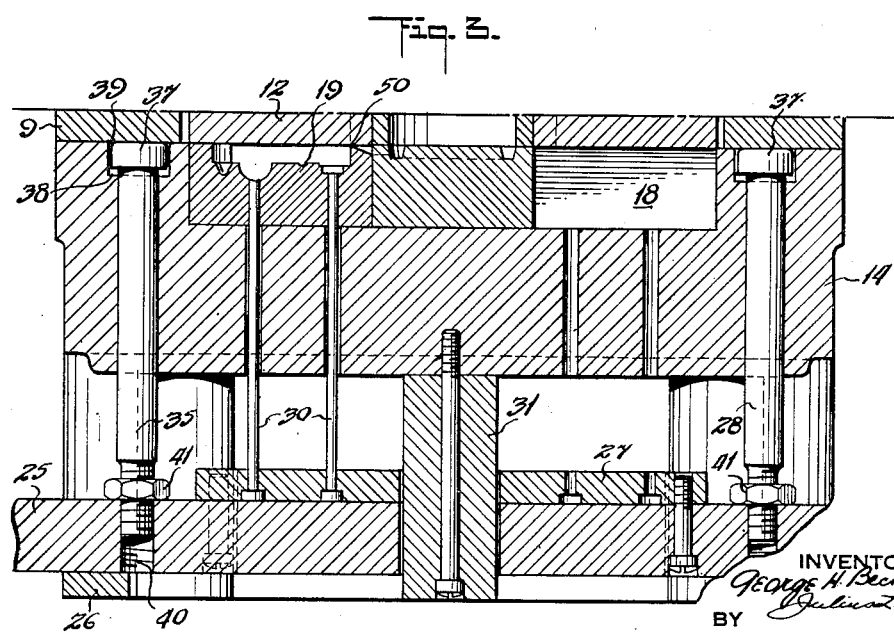
INVENTORS
George H. Beck and
Julius L. Torio
BY
S. Stephen Baker
ATTORNEY Nov. 28, 1950   G. H. BECK ET AL   2,531,965
MOLD BASES
Filed March 4, 1949   3 Sheets-Sheet 3
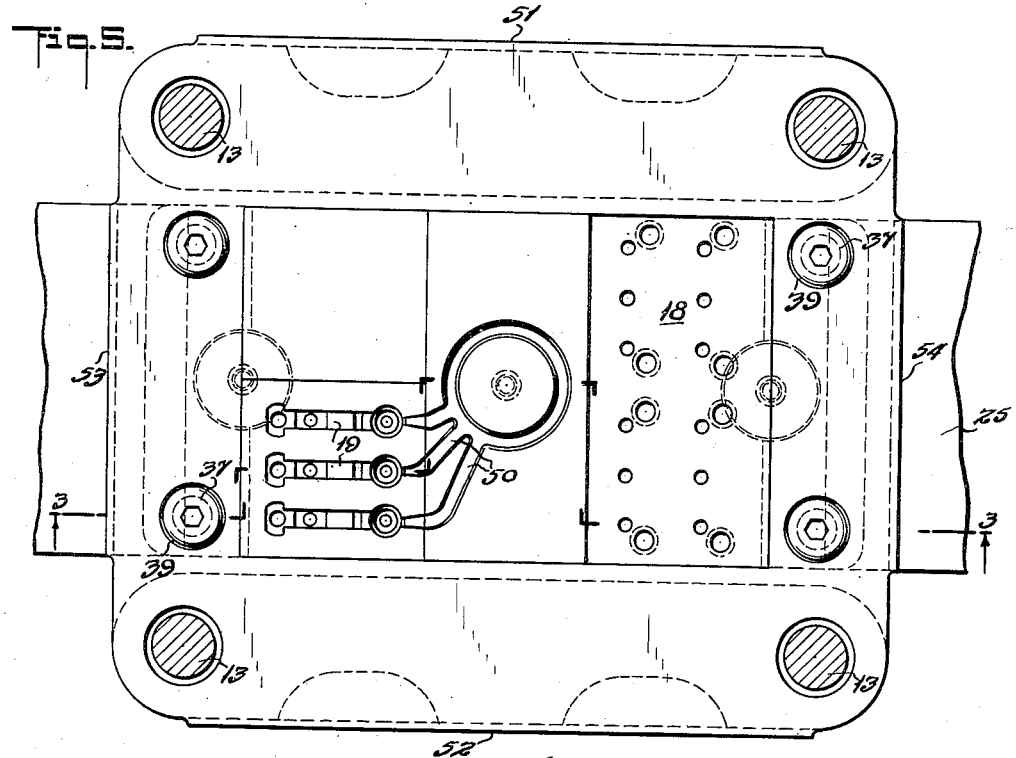
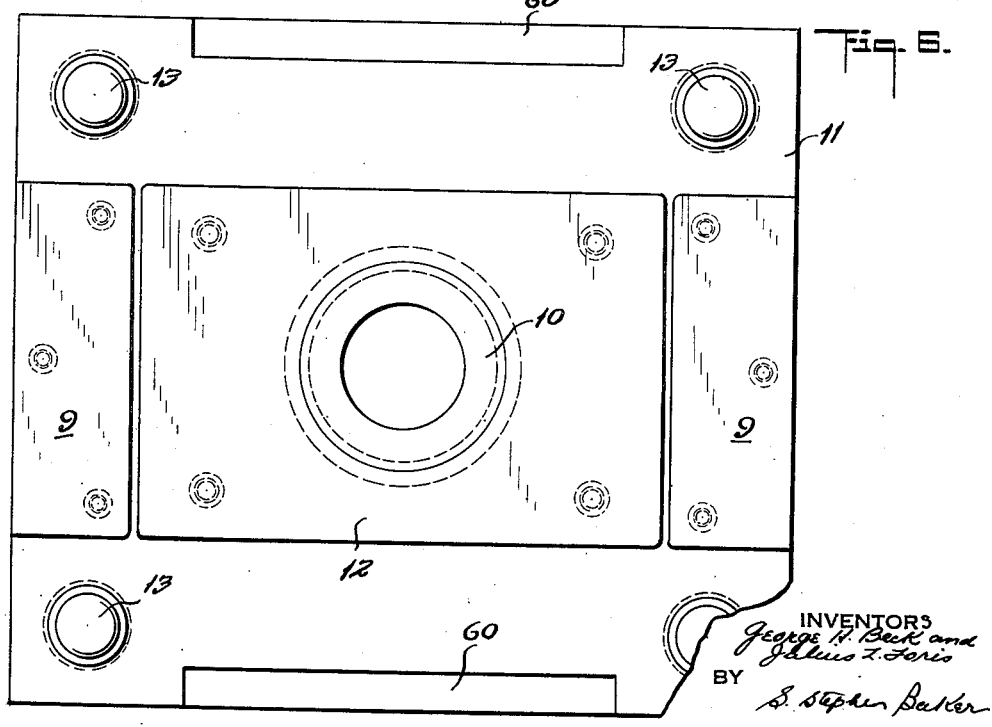
INVENTORS
George H. Beck and
Julius L. Loris
BY
S. Stephen Baker
ATTORNEY Patented Nov. 28, 1950

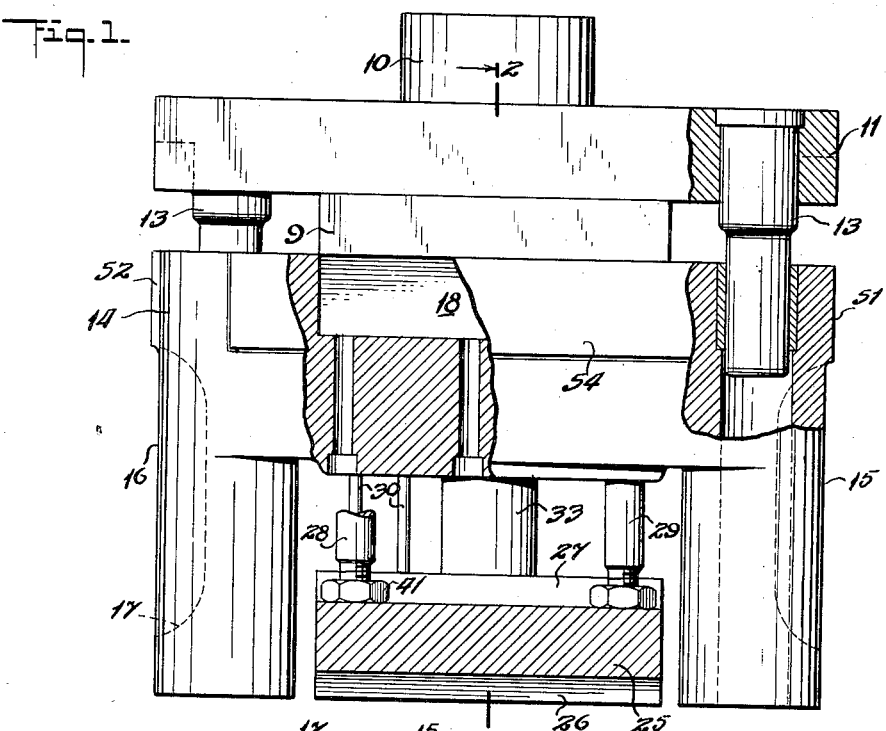
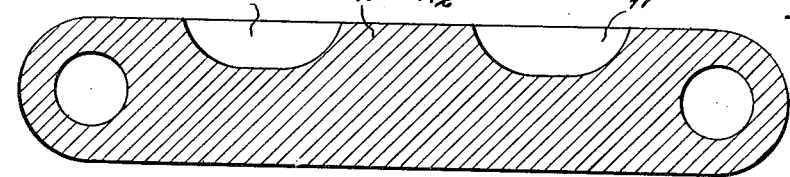
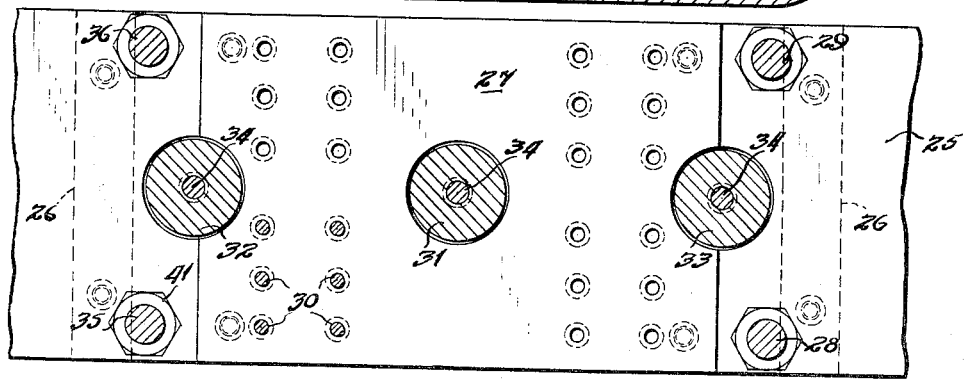

2,531,965

UNITED STATES PATENT OFFICE 2,531,965

MOLD BASE

George H. Beck, Maplewood, and Julius Z. Foris, Union, N. J.

Application March 4, 1949, Serial No. 79,537

6 Claims. (Cl. 18—42)

This invention relates to standard mold bases for plastic molds or for die casting dies.

The movable or ejector portion of a standard mold base conventionally comprises a plurality of plates which are intersecured to form such movable portion. An ejector plate including ejector pins is arranged for sliding movement within and in respect to the mold base. The immovable or front portion of the mold base generally has leader pins disposed therethrough and which further extend throughout the plates of the rear portion.

The connection of a standard mold base to a molding machine involves precision operations in that the separate plates require considerable surface machining in order that they all meet accurately. Precision of alignment of such plates is of extreme importance because the leader pins, ejector pins and other elongated elements reciprocate through aligned openings in these plates. The assembly of these parts is an operation requiring considerable time and careful attention.

According to the present invention, a simplified standard mold base is provided which eliminates a large part of the machining heretofore required in producing the mold base of separate plates. The assembly and maintenance of the mold base are further reduced to a minimum. This is accomplished by a special arrangement wherein a unitary structure supplants at least three separate components plus screws and dowels of the conventional mold base. Such unitary structure is so formed as to eliminate the conventional separate anchor plate, parallels or spacers, back-up plate, and rear cavity plate. These find their counterparts in a unitary structure which is further formed with clamping recesses heretofore provided by overhang of the anchor or clamping plate or slotting of the parallels. In order to render such a unitary structure possible, the instant mold base dispenses with a back stop for limiting rearward movement of the injector plate. If a conventional back stop were employed, the assembly of the injector components into the mold base would be rendered quite difficult because such ejector components usually operate between the rear anchor plate and the back-up plate. The instant invention eliminates such a rear anchor plate or any other type of rear stop. Rearward movement of the ejector plate is limited by the particular formation of the push-back pins which are connected to the ejector plate. Such ejector pins are further made variable in effective length so as to accommodate various thicknesses in the articles to be molded.

The invention will be further understood from the following description and drawings in which:

Fig. 1 is a front view in elevation, partly broken away, of a mold base made according to the instant invention.

Fig. 2 is a cross-sectional view taken along the lines 2—2 of Fig. 1.

Fig. 3 is a cross-sectional view showing the ejector plate and push-back pin assembly as seen along the lines 3—3 of Fig. 5.

Fig. 4 is a cross-sectional view taken along the lines 4—4 of Fig. 2.

Fig. 5 is a top plan view of the rear cavity or retainer plate as connected to the remainder of the base.

Fig. 6 is a top plan view of the front cavity or retainer plate.

The immovable portion of the molding base comprises the usual locator, nozzle and sprue bushing or transfer pot as shown at 10, the anchor plate 11, the pressure pads 9, and the front cavity retainer plate 12. These are suitably connected in any conventional manner. Leader pins 13 are connected to anchor plate 11 and extend outwardly for their aligning function.

The movable or ejector portion of the mold base comprises a unitary structure 14 which extends throughout the length of such portion. Accordingly, the mold base does not employ those plates hereinabove described. Structure 14 incorporates the function of the rear cavity plate, the back-up plate, and the parallels or spacers as well as adding additional functions as will hereinafter appear. Thus, the sides or arms 15 and 16 are formed with one or more recesses, such as 17. Such recesses permit clamping of the mold base to a conventional or die casting molding machine and thereby eliminate the requirement for the overhang of the anchor or clamping plate or slotting of the parallels. Structure 14 may be shaped like an inverted U so that the arms 15 and 16 appear as platforms supporting the transverse structure which carries the molds as in nest 18 which may be rough cast to suitable shape and size. A mold cavity 19 is also illustrated.

Ejector plate 25 is disposed within the opening of structure 14 so as to slide therein between the arms 15 and 16. It is provided with a stop bar 26 and a pin plate 27, the function of which is to support the push-back pins 28, 29, 35 and 36 as well as the knock-out pins 30, a plurality of which are provided to eject the plastic or metal molding as is conventional. The shafts 31, 32 and 33 are connected to the transverse portion of structure 14 as by bolts 34. It will be understood that the ejector mechanism slides on such shafts by having openings therethough for this purpose. The push-back pins serve their usual purpose of causing aligned retraction of the ejector plate when the mold is brought together for ejection or compression.

In Fig. 3 is illustrated the connection of the push-back pins and knock-out pins to the ejector plate 25. The knock-out pins operate through suitable openings in the transverse portion of structure 14 so as to enter the molds such as mold 19 for the usual purpose of dislodging the formed article. Push back pins such as 35 may be a standard stripper bolt. All of the push-back pins are rendered adjustable as to length by being received in threaded openings 40 of ejector plate 25 and by being provided with nuts 41 by which the length of the push-back pins may be adjusted. Subsequent adjustments may be made changing the thickness of stop bar 26 and turning of bolts 35. This is an important feature in determining the extent of retractability of the ejector plate or the degree of protrusion of the push-back pin in respect to the rear cavity retainer portion.

The provision of the large heads of the push-back pin maintains the assembly of the mold base notwithstanding the fact that no clamping or anchor plate is provided in the movable portion of the mold base. Assembly of the mold base is thus facilitated because the ejector plate need merely be inserted in place as will be evident from Fig. 1 and the push-back pins may be inserted through the rear cavity molding surface and threaded into the openings 40 so as to maintain the assembly of the mold base.

In Fig. 5 is illustrated a top plan view of the rear cavity molding surface. The injected substance flows through the gates 59 as will understood by those skilled in the art and such substance is directed into molds 19 in the rear cavity retainer surface in the conventional manner.

Unitary structure 14 may be formed of semi-steel, steel or other metals as by a casting process and thereafter machined so that it is of a precision suitable for its purpose. Accordingly, pads are formed integral with structure 14 at strategic places whereby the structure may be brought to the required dimensions, and at required angular relationship with each other and the rear cavity molding surface. Thus, pads 51, 52, 43 and 54 (Fig. 1) are formed on all four sides of the upper portion of structure 14. The lower surface of the transverse structure is also provided with a pad 55 because this surface meets the secondary ejector plate 27 when the ejector plate is inwardly operated. The provision of such pads at the places indicated insures that the unitary structure, which may be more or less roughly cast, is rendered suitable for precision operations by a minimum of machining.

In Fig. 6 is shown the front cavity retainer plate 12, pressure pads 9, recesses 60, and leader pins 13. These elemtns are conventional.

A mold base such as disclosed above has been found to be effective for injection, compression, transfer, plunger, plastic molds and practically all types and conditions of plastics molding and die castings although it is in large part preformed as by a casting process in such a way that a great deal of high skilled operations are avoided. Furthermore, a superior mold is provided. Many changes or omissions may readily suggest themselves and it is therefore desired to limit the scope of the invention by the appended claims.

What is claimed is:
1. A mold base comprising an inverted U-shaped unitary structure having integral supporting arms and a transverse portion, an ejector plate mounted for reciprocating movement within the inverted U-shaped opening of the structure between and parallel to said arms, push-back pins connected to said ejector plate, enlarged heads formed on the free ends of said push-back pins, said push-back pins being slidable in elongated openings formed in the transverse portion of said unitary structure, and shoulders formed in said elongated openings for engaging said enlarged heads so as to contact and predetermine rearward movement of said ejector plate, said push-back pins having their connected ends threadedly engaged with complementary openings in said ejector plate, such connection serving to regulate the effective length of said push-back pins.

2. A mold base according to claim 1 and wherein the limit of rearward movement of said ejector plate is at substantially the same line as the free ends of the arms of said inverted U-shaped unitary structure, said arms being formed with depressions therein to permit clamping of the unitary structure and ejector plate to a molding machine.

3. A mold base according to claim 2 and including a front anchor plate and a front cavity retainer plate secured thereto, and leader pins immovably connected through said anchor plate and extending therefrom so as to enter into complementary openings in the arms of said unitary structure approximately one-third the length of said arms.

4. A mold base comprising an inverted U-shaped unitary structure having integral supporting arms and a transverse portion, an ejector plate mounted for reciprocating movement within the inverted U-shaped opening of the structure between and parallel to said arms, push-back pins connected to said ejector plate, enlarged heads formed on the free ends of said push-back pins, said push-back pins being slidable in elongated openings formed in the transverse portion of said unitary structure, shoulders formed in said elongated openings for engaging said enlarged heads so as to limit rearward movement of said ejector plate, said push-back pins having their connected ends threadedly engaged with complementary openings in said ejector plate, such connection serving to regulate the effective length of said push-back pins, an opposing mold base portion for immovable connection to a molding machine, said opposing portion including a front anchor plate and a front cavity retainer plate secured thereto, leader pins immovably connected to said anchor plate and extending therefrom so as to enter into complementary openings in said arms approximately one-third the length of said arms, and integral pads formed at the top outer portions of said arms and on the underside of said transverse portion so as to permit machining thereof until the mold base reaches the proper dimensions.

5. A mold base according to claim 4 and including a pair of concave depressions formed on the outer portions of each arm below the pads thereof, said depressions serving as clamping means for connecting the mold base to a molding machine.

6. A mold base comprising an inverted U-shaped structure having supporting arms and a transverse portion, an ejector plate mounted for reciprocating movement within the inverted U-shaped opening of the structure between and parallel to said arms, push-back pins connected to said ejector plate, enlarged heads formed on the free ends of said push-back pins, said push-back pins being slidable in elongated openings formed in the transverse portion of said structure, and shoulders formed in said elongated openings for engaging said enlarged heads so as to contact and predetermine rearward movement of said ejector plate, said push-back pins having their connected ends threadedly engaged with complementary openings in said ejector plate, such connection serving to regulate the effective length of said push-back pins.

GEORGE H. BECK.
JULIUS Z. FORIS.

REFERENCES CITED

The following references are of record in the file of this patent:

UNITED STATES PATENTS

| Number | Name | Date |
|---|---|---|
| 1,584,171 | Herrick | May 11, 1926 |
| 1,916,692 | Scribner | July 4, 1933 |
| 2,377,128 | Burgess | May 29, 1945 |
| 2,419,089 | Quarnstrom | Apr. 15, 1947 |